Figure 1:
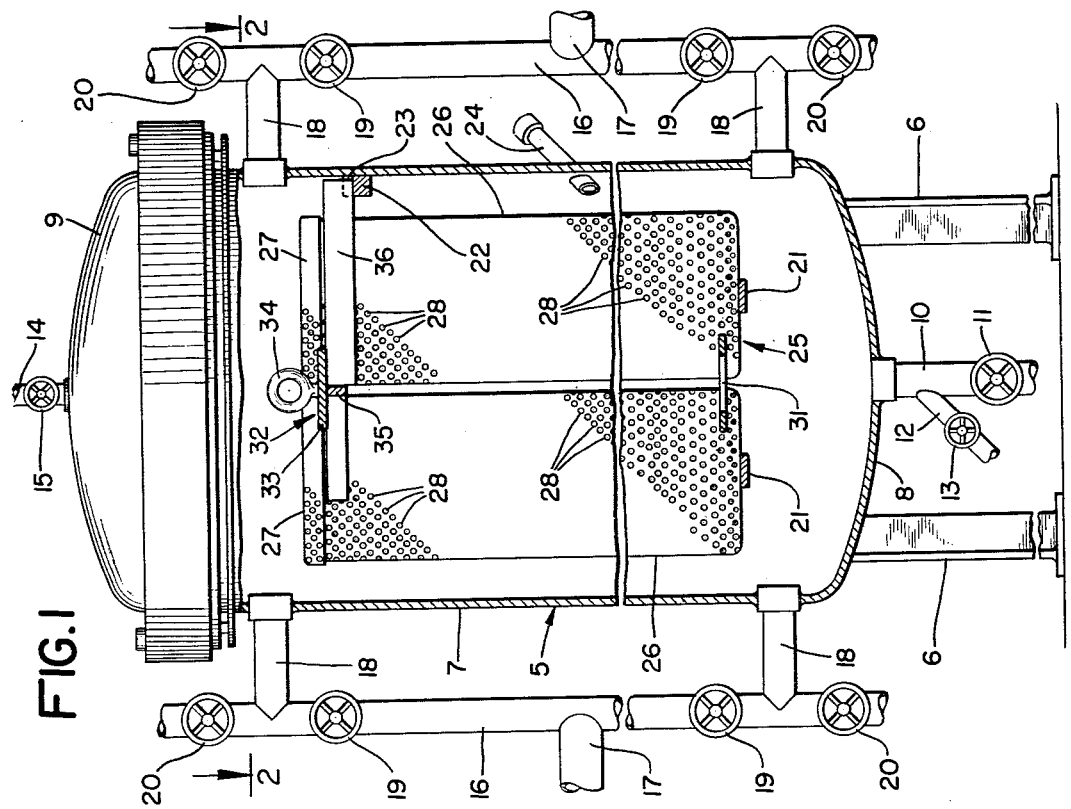

July 5, 1955     J. F. HALE ET AL     2,712,501

TREATMENT OF COFFEE

Filed April 9, 1954

INVENTORS.
JAMES F. HALE
ROBERT B. NOTTINGHAM
EDWARD W. PITZ, JR.
BY *J. P. Churchill*

ATTORNEY.

United States Patent Office 2,712,501
Patented July 5, 1955

2,712,501

TREATMENT OF COFFEE

James F. Hale, Syracuse, N. Y., Robert B. Nottingham, Richmond, Va., and Edward W. Pitz, Jr., Westfield, N. J., assignors to The Borden Company, New York, N. Y., a corporation of New Jersey Application April 9, 1954, Serial No. 422,057

8 Claims. (Cl. 99—71)

This invention relates to the treatment of coffee and, in one of its more specific aspects, to an improved method of steam roasting coffee, whereby to increase the yield of soluble coffee derived therefrom as compared to the yield obtainable from coffee that is roasted by any of the conventional methods.

This application is a continuation-in-part of our pending application Serial No. 238,728, filed July 21, 1951.

The primary object of the invention is to provide an improved method of roasting coffee with the aid of steam.

Another object of the invention is to increase the yield of soluble coffee from green or substantially green coffee beans.

A further object of the invention is to adjust or control the flavor of steam roasted coffee, as desired.

To the end that the foregoing objects may be readily attained, the method of treating coffee in accordance with this invention preferably comprises subjecting green coffee beans to saturated steam at a temperature within the range of 338° F. to 435° F. and at a pressure within the range of 100 to 350 pounds per square inch gauge in a closed zone for a period within the range of 2 to 15 minutes. The pressure in the closed zone is then gradually reduced to atmospheric pressure over a period of from 30 seconds to 5 minutes. A vacuum is next applied to the closed zone to thereby further reduce the pressure therewithin to a pressure within the range of 24 to 29 inches of mercury for a period within the range of 1 to 10 minutes.

While the preferred method of practicing the invention includes the last referred-to step, namely that of applying a vacuum to the closed zone as indicated, we have found that good results may also be obtained by omitting this step. In either case, the coffee beans are then withdrawn from the closed zone and are cut or ground with the aid of suitable equipment for this purpose. The ground coffee is then extracted with water and treated in the usual manner to produce a soluble coffee extract.

Soluble coffee extract so produced is acidic, having a pH of from about 4.3 to 4.55. We have found that the pH of the extract may be readily neutralized, and the flavor of the coffee improved, by treating the same with a 20% aqueous solution of sodium hydroxide, or by blending the extract with a more alkaline extract of conventionally roasted coffee. Sodium bicarbonate, sodium carbonate, potassium bicarbonate, or any other suitable basic compound may be used in lieu of sodium hydroxide for raising the pH of the extract from 4.3 to about 5.2. Proper pH adjustment may be attained by treating the extracting water or by treating the extracted coffee.

The extract, after neutralization, may be dried in any desired manner known to the art. The resulting dry coffee powder may then be ground and sifted with the aid of conventional equipment presently employed in the industry.

The enumerated objects as well as other objects, together with the advantages attainable by the practice of this invention, will be readily understood by persons skilled in the art from the following detailed description taken with reference to the accompanying drawing which illustrates a recommended arrangement of apparatus for carrying out the several steps of the invention.

Figure 2:
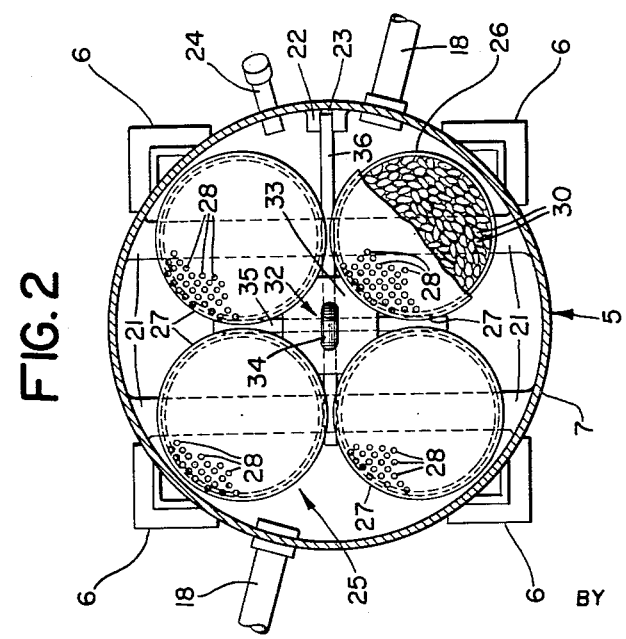

In the drawing:

Figure 1 is a view in front elevation of a pressure vessel employed in practicing the method of this invention, partly in central vertical cross section; and Figure 2 is a view taken along line 2—2 of Figure 1.

Referring now to the drawing, wherein like reference numerals denote corresponding parts throughout the several views, we have illustrated therein an upright cylindrical pressure vessel 5, supported on a plurality of legs 6. Vessel 5, in operation, constitutes a closed zone and comprises a tubular side wall 7, a bottom wall 8 integral with the side wall, and a removable top wall or cover 9. The vessel has a bottom outlet pipe 10 that is provided with a control valve 11. Communicating with pipe 10 is a branch pipe 12 also having a control valve 13. The vessel is equipped with a top outlet pipe 14 having a control valve 15.

Disposed to opposite sides of the pressure vessel is a pair of vertical manifolds 16, each of which is connected to a steam supply pipe 17 that communicates with a source of steam (not shown). Each manifold has a pair of laterals 18 that respectively communicate with the interior of the upper and lower portions of the vessel. The manifold 16 has pairs of valves 19 and 20 located to opposite sides of corresponding laterals 18. The upper and lower ends of each manifold are adapted to be connected to a vacuum pump (not shown).

A pair of parallel, horizontal support bars 21 extends across the interior of the pressure vessel and is secured to the side wall 7 thereof, preferably by welding. Also welded to side wall 7 is a basket indexing block 22 that is positioned in the upper portion of the vessel and that has a slot 23 formed therein. An inclined well 24 extends through the vessel, substantially midway between the top and bottom thereof. This well is adapted to receive a thermometer and/or be connected to a pressure gauge or other instrumentalities for ascertaining conditions within the vessel.

Removably positioned within the pressure vessel and supported by bars 21 is a basket arrangement 25 that comprises a plurality, preferably four, of stainless steel baskets 26, each of which is closed at the bottom, and has a removable cover 27. The side wall, bottom and cover of each basket are perforated as indicated at 28. These perforations are of a size to permit steam to enter into the baskets while preventing coffee beans 30, contained in the baskets, from passing therethrough. Secured to the lower portion of each basket, by welding, is a brace plate 31. A frame 32 is attached to the upper portion of each basket. This frame comprises a plate 33 that is welded to each basket and that has an upwardly projecting eye connector 34. Also welded to each basket and to plate 33 is a pair of cross bars 35 and 36, the latter bar being elongated and adapted to register with slot 23 in block 22.

For the purpose of describing a preferred and recommended method of practicing the invention with the aid of the illustrated apparatus, it is first assumed that the apparatus is assembled as shown in Figure 1, that each basket 26 is substantially filled with coffee beans, and that all of the valves are closed. The coffee beans in the baskets may consist of untreated green beans, or green beans that have already been lightly roasted to a sufficient extent to dry only the outsides thereof. Further, the beans may consist, for example, of a blend of 80% Santos coffee and 20% Columbian coffee by weight. Valves 19 are opened and saturated steam under high pressure is introduced into vessel 5 by way of steam supply pipes 17, manifolds 16 and laterals 18. Valves 11 and 15 are opened sufficiently to permit air within the vessel and steam introduced thereinto to be bled off by way of pipes 10 and 14, respectively. The steam is permitted to attain a pressure of 150 pounds per square inch gauge in two or three minutes with the temperature of the steam at 360° F., under normal operating conditions. At the end of about three minutes from the time the steam is turned on and assuming the pressure comes up to 150 pounds per square inch normally, the timing of the roasting period is begun and the steam pressure is maintained at approximately 150 pounds per square inch gauge and at 360° F. for a period of eight minutes. During this period, a slight amount of steam is still being bled off continuously through outlet pipes 10 and 14. In this manner, a thorough penetration of the steam into the interior of all of baskets 26 is attained.

At the end of the eight-minute roasting period, valves 19 are all closed to terminate the supply of steam to the pressure vessel and valve 13 is fully opened to permit the pressure in the vessel to drop gradually to atmospheric pressure. The sizes of pipes 10 and 12 and valve 13 are so selected that the pressure within the vessel falls from 150 pounds per square inch to atmospheric over a period of about three minutes.

At the end of the three-minute period during which the pressure within the vessel drops to atmospheric, valve 13 is closed and valves 20 are opened. A vacuum pump (not shown) applies a vacuum to the vessel by way of the upper and lower ends of each manifold 16 and laterals 18. The vacuum pump is controlled so as to lower the pressure in the vessel to somewhat below 26 inches of mercury initially, and then permit the pressure in the vessel to attain the value of 26 inches of mercury. The total period during which the vessel and contents are under vacuum is six minutes, the pressure in the vessel being below 26 inches of mercury for approximately two minutes and at about 26 inches of mercury for the remaining four minutes. The vacuum treatment serves to cool and dry the beans. At the end of the six-minute interval, valves 20 are closed and valve 13 is reopened, thereby releasing the vacuum in the vessel and permitting the pressure therein to return to atmospheric. Cover 9 is then raised and basket arrangement 25 is removed from the interior of the vessel.

We find that coffee beans treated as outlined above are intact upon withdrawal from the baskets and are not exploded or otherwise disintegrated due to the treatment. Also, the individual beans are slightly smaller in size than like beans that are roasted in accordance with conventional procedures. Moreover, the beans are not as brittle as conventionally roasted beans.

Upon removal from the baskets, the roasted beans are further cooled and dried. The beans are then fed through a suitable mill and ground. The ground beans are next extracted with suitable amounts of water in the usual manner.

The pH of a number of extracts produced as outlined above has varied from about 4.3 to 4.55. We find that the pH of the extract may be readily neutralized and the flavor of the coffee improved by the addition of an aqueous solution of sodium hydroxide or equivalent, or the pH can be adjusted by blending the extract with an extract obtained from conventionally roasted coffee. In either case, it is usually desirable to raise the pH of the extract to between 4.5 and 5.5. Following the pH adjustment, the coffee extract may be dried on a commercial type vacuum drum drier. The resulting coffee powder is then ground and sifted with the aid of conventional equipment.

From the foregoing, it is believed that the many advantages obtainable by the practice of the present invention will be readily apparent to persons skilled in the art. However, since certain changes may be made in carrying out the above method without departing from the scope of the invention as defined by the appended claims, it is intended that all matter contained herein shall be interpreted as illustrative and explanatory, rather than in a limiting sense.

We claim:

1. The method of treating coffee comprising subjecting coffee beans to saturated steam generated from moisture other than that contained in the beans at a temperature within the range of 338° F. to 435° F. and at a pressure within the range of 100 to 350 pounds per square inch gauge in a closed zone for a period within the range of 2 to 15 minutes, simultaneously bleeding off from the closed zone part of the steam and constituents that are evolved from the beans and entrained in the steam, and then gradually reducing the pressure in the closed zone to atmospheric pressure over a period within the range of 30 seconds to 5 minutes.

2. The method of treating coffee comprising subjecting coffee beans to saturated steam generated from moisture other than that contained in the beans at a temperature within the range of 338° F. to 435° F. and at a pressure within the range of 100 to 350 pounds per square inch gauge in a closed zone for a period within the range of 2 to 15 minutes, simultaneously bleeding off from the closed zone part of the steam and constituents that are evolved from the beans and entrained in the steam, gradually reducing the pressure in the closed zone to atmospheric pressure over a period within the range of 30 seconds to 5 minutes, successively grinding and extracting the product of the preceding step with water, and adjusting the pH of the resulting extract with a solution comprising a basic compound.

3. The method in accordance with claim 1, wherein the product thereof is successively ground and extracted with water, and the pH of the extracted coffee is adjusted by the addition of an aqueous solution of a basic compound.

4. The method in accordance with claim 1, wherein the product thereof is successively ground and extracted with water containing a basic compound, whereby to adjust the pH of the end product.

5. The method in accordance with claim 1, wherein the product thereof is successively ground and extracted with water, and the pH of the resulting extract is subsequently adjusted by blending the same with an extract obtained from conventionally roasted coffee.

6. The method of treating coffee comprising subjecting coffee beans to saturated steam generated from moisture other than that contained in the beans at a temperature within the range of 338° F. to 435° F. and at a pressure within the range of 100 to 350 pounds per square inch gauge in a closed zone for a period within the range of 2 to 15 minutes, simultaneously bleeding off from the closed zone part of the steam and constituents that are evolved from the beans and entrained in the steam, gradually reducing the pressure in the closed zone to atmospheric pressure over a period within the range of 30 seconds to 5 minutes, and thereupon further reducing the pressure in the closed zone to a pressure within the range of 24 to 29 inches of mercury for a period within the range of 1 to 10 minutes.

7. The method of treating coffee comprising subjecting coffee beans to saturated steam generated from moisture other than that contained in the beans at a temperature within the range of 338° F. to 435° F. and at a pressure within the range of 100 to 350 pounds per square inch gauge in a closed zone for a period within the range of 2 to 15 minutes, simultaneously bleeding off from the closed zone part of the steam and constituents that are evolved from the beans and entrained in the steam, gradually reducing the pressure in the closed zone to atmospheric pressure over a period within the range of 30 seconds to 5 minutes, thereupon further reducing the pressure in the closed zone to a pressure within the range of 24 to 29 inches of mercury for a period within the range of 1 to 10 minutes, drying the beans, grinding the beans, and extracting the ground beans with water to produce a soluble coffee extract, and adjusting the pH of the extract to a range between 4.5 and 5.5.

8. The method of treating coffee comprising subjecting coffee beans to saturated steam generated from moisture other than that contained in the beans at a temperature of about 360° F. and at a pressure of about 150 pounds per square inch gauge in a closed zone for a period of about eight minutes, simultaneously bleeding off from the closed zone part of the steam and constituents that are evolved from the beans and entrained in the steam, gradually reducing the pressure in the closed zone to atmospheric over a period of about three minutes, and thereupon further reducing the pressure in the closed zone to a pressure of about 26 inches of mercury for a period of about six minutes.

References Cited in the file of this patent

UNITED STATES PATENTS

| | | |
|---|---|---|
| 115,302 | Galloway | May 30, 1871 |
| 308,169 | Jennings | Nov. 18, 1884 |
| 1,788,705 | Close | Jan. 13, 1931 |
| 2,572,679 | Torres | Oct. 23, 1951 |
| 2,581,148 | Scull, 2nd, et al. | Jan. 1, 1952 |
| 2,632,706 | Montgomery, Jr. | Mar. 24, 1953 |